United States Patent

[11] 3,532,043

[72] Inventors Jun Shimomura
Tokyo;
Shigeo Ono, Yokohama-shi; Takashi Kageura, Tokyo, Japan
[21] Appl. No. 633,554
[22] Filed April 25, 1967
[45] Patented Oct. 6, 1970
[73] Assignee Nippon Kogaku K.K.,
Tokyo, Japan,
a corporation of Japan
[32] Priority May 7, 1966
[33] Japan
[31] 41/28,503, 41/28,504, 41/28,505;
(utility model) 41/41,681

[54] EXPOSURE METER FOR MEASURING THE ILLUMINATION OF IMAGE AREA
10 Claims, 12 Drawing Figs.
[52] U.S. Cl. ............................................. 95/42, 95/10
[51] Int. Cl. ....................................... G03b 19/12
[50] Field of Search ............................... 95/42, 10; 352/141, 95/44

[56] References Cited
UNITED STATES PATENTS
3,185,052  5/1965  ............................. 352/141

FOREIGN PATENTS
1,141,093  12/1962  Germany ................. 95/10
1,048,365  4/1965  Great Britain............. 95/10(C)UX
1,208,620  1/1966  Germany ................. 95/42

Primary Examiner—Norton Ansher
Assistant Examiner—Richard L. Moses
Attorney—Anton J. Wille ABSTRACT: An exposure meter arrangement in a single reflex camera for measuring the illumination of the entire area or a portion of the area of the camera focusing plate. In one embodiment, two spaced photocells are provided, each having its own lens complement and stop for producing an electrical signal in accordance with the illumination of the particular area covered. A selector switch connects one or the other of the photocells into the exposure meter circuit. In another embodiment a single photocell is provided together with a zoom lens system, the movable lens of the system being movable by a manually operable lever provided with area restricting members for the focusing plate image, the image of the particular area selected being focused on the photocell to provide an electrical signal in accordance with the illumination of the selected area. Other embodiments are described in which a filter is inserted to change the sensitivity of the exposure meter, and in which a selective stop mechanism is provided for the photometric lens system to provide selected areas of the focusing plate for illumination measurements.

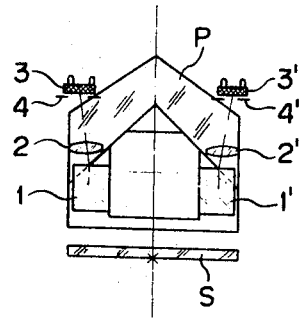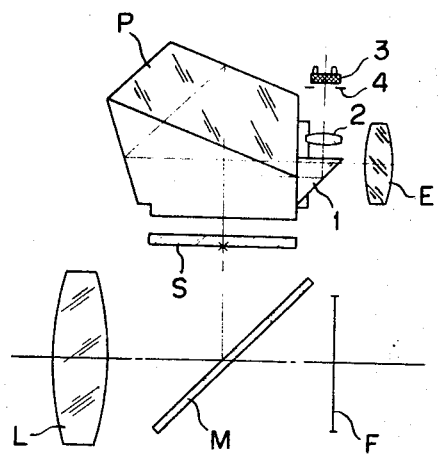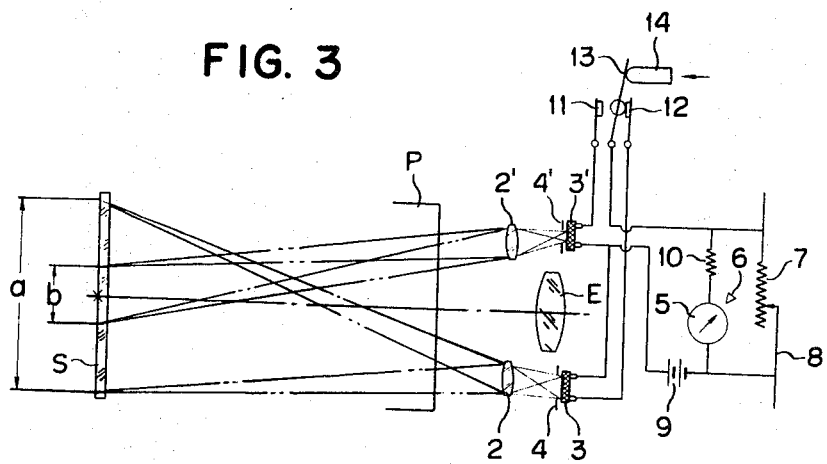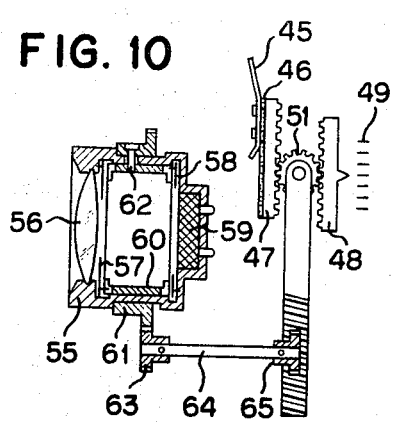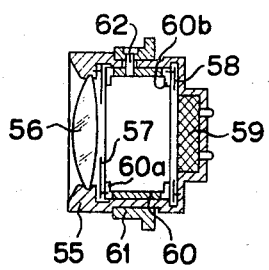

Patented Oct. 6, 1970

Patented Oct. 6, 1970
3,532,043
Sheet 3 of 3
FIG. 5
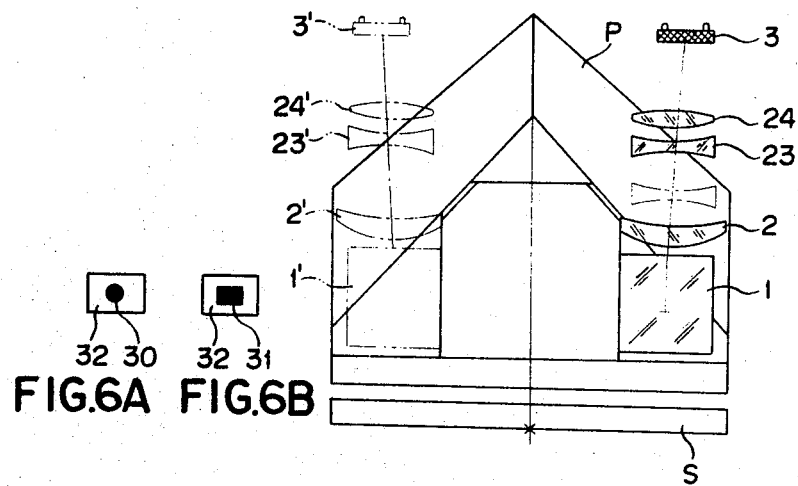
FIG.6A  FIG.6B
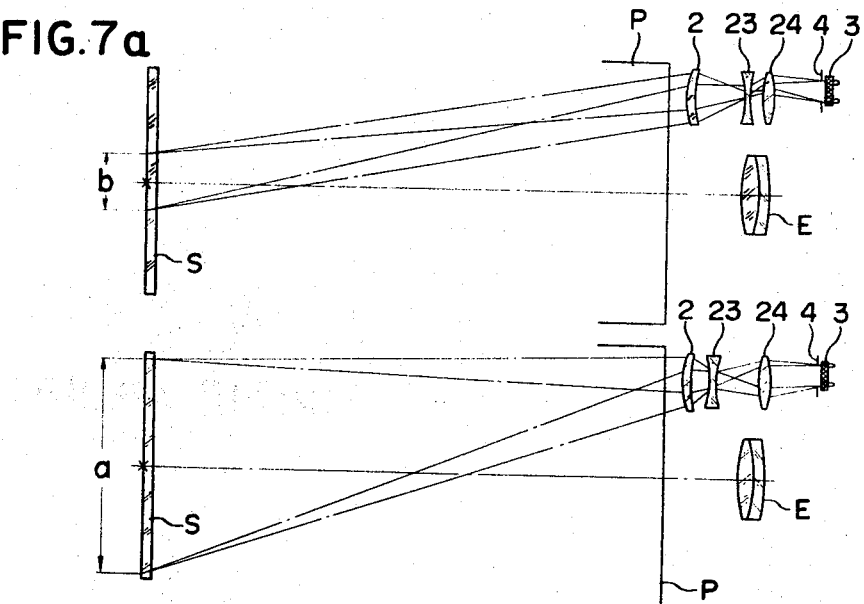
FIG.7a
FIG.7b

EXPOSURE METER FOR MEASURING THE ILLUMINATION OF IMAGE AREA

This invention relates to an exposure meter for measuring the brightness of an image area on the focusing glass of a single-lens reflex camera.

In conventional exposure meters to determine the exposure by measuring the intensity of the light rays of a scene passing through a camera lens, photometric measurements are made for measuring the average of the light intensity of a large surface, and for measuring the light intensity of a desired limited area of the image surface. It is difficult to decide which system is better since the light measurement depends upon the distribution of the brightness of an object and related to the intention of the photographer to determine which portion of the object should be given the proper exposure. For example, when the whole image surface is taken, this system is adapted for most of the objects that amateurs photograph. When this system is employed, no special consideration is required in carrying out the measurement and therefore this system is most generally employed. In the case where strongly lighted objects are within the image surface, there is a tendency that the exposure meter is affected thereby and gives an inaccurate reading. Therefore, it is important to obtain the proper exposure for the main object which the photographer intends to photograph. On the other hand, in the case of measuring the light intensity of a portion of the image surface, it is possible to obtain the proper exposure of the main subject which the photographer intends to photograph. But in the case where there are more than two subjects of equal interest within the image area, or in case the change in ratio of brightness and ratio area of the portion of the object to be measured are great, it is necessary to calculate the proper intermediate value by reading more than two indicated values, with the result that the handling thereof becomes complicated and therefore this last mentioned system is difficult for the amateur.

It is therefore an object of the invention to provide an exposure meter selectively enabling photometry of either a wide image surface or a small image surface.

It is another object of the invention to provide constant incident light rays at a light-receiving surface regardless of the change of image to be measured.

The proper exposure value which can be determined by shutter time or the size aperture stop of the camera lens is directly related to the density level of a film after it is exposed and developed. In photographing an object or scene by either of the two systems there arises a question of which system should be employed. In other words, in the distribution of objects to be photographed, the main object, such as persons having comparatively weak brightness and small area ratio on the image area and a background, such as sky, sea, snow or mountains, having comparatively strong brightness and large area ratio on the image area, are randomly distributed over the total image area in most cases. Therefore, with measurement of the light intensity of part of the image surface the exposure of the main object alone is regarded to be important, and the tone of the whole image area is ignored since most of the range of the image area to be measured covers the main object. Therefore, the density level of the main object which corresponds exactly to the measured value can be obtained, but in the case of measuring the light intensity of the whole image surface, the average value would tend to deviate to the bright portion, and the exposure meter would give a reading which is affected thereby, resulting in an inaccurate exposure of the main object. It is important to obtain the same density level of the main object in the case of measuring the light intensity of the desired limited area of the image surface.

It is a further object of the invention to provide an exposure meter in which the density level of the film with respect to the main object to be photographed can be kept almost constant regardless of the change of the image area to be photographed.

According to the present invention, with these objects in view, an exposure meter is provided for correctly measuring the illumination of an image area on the focusing glass in the range of either a small or wide image surface. There is provided a switch device to selectively use either of the photoconductive elements having respective stops for receiving light rays from the small and wide image surfaces or a zoom optical system for changing continuously or stepwise the measuring range of the image surface. In the latter case, at least one photoconductive element is sufficient for the purpose. Furthermore, in accordance with the present invention, undesired light rays which otherwise enter from the viewfinder eyepiece are prevented with the provision of a light receiving lens arranged intermediate the focusing plate and the light receiving element, which is at the rear of the focusing plate and out of the viewfinder light path.

In carrying out the operation to control the light-receiving angle, the focal length of the light-receiving lens can be changed, and an optical or mechanical lattice or optical fibers can be used in place of the light-receiving lens. It is also possible to employ zoom optical system as the light-receiving lens as hereinafter mentioned. In case the range of the image surface to be measured is changed by means of a zoom lens system, at least one light-receiving portion is sufficient. When a zoom system in which the aperture ratio and aperture eclipse are not changed by the zoom effect is adopted, there is an advantage that it is not necessary to correct the pointer of the galvanometer. In the same manner when such a light-receiving portion in which the sensitivity of the exposure is not changed even when light-receiving angle is changed, it is not necessary to carry out the correction of the pointer of the galvanometer.

In the case of a single-lens reflex camera, there is the possibility that the finder image surface is affected by extraneous light from the eyepiece of the viewfinder or the illumination therof diminished. It is therefore preferable to form a separate light ray path angularly disposed with respect to the viewing light rays for photometry as illustrated in the embodiments herinafter described.

The invention will be described more in detail referring to the illustrative embodiments of the invention shown in the attached drawing in which:

FIG. 1 is a schematic view of the first embodiment of the invention;

FIG. 2 shows a side view of FIG. 1 as seen from its right side;

FIG. 3 shows the photometric light paths and the electric connections of the elements of FIG. 1;

FIG. 5 shows a portion of FIG. 4 when viewed from the eyepiece side;

FIGS. 5A and 6B show indication means employed in the embodiment of FIG. 4;

FIGS. 7A and 7B show photometric light paths for the elements of FIG. 4;

FIGS. 9 and 10 show a fourth embodiment of the invention using another type of light-receiving portion, in FIG. 10 a compensating device is included therewith.

Figure 4:
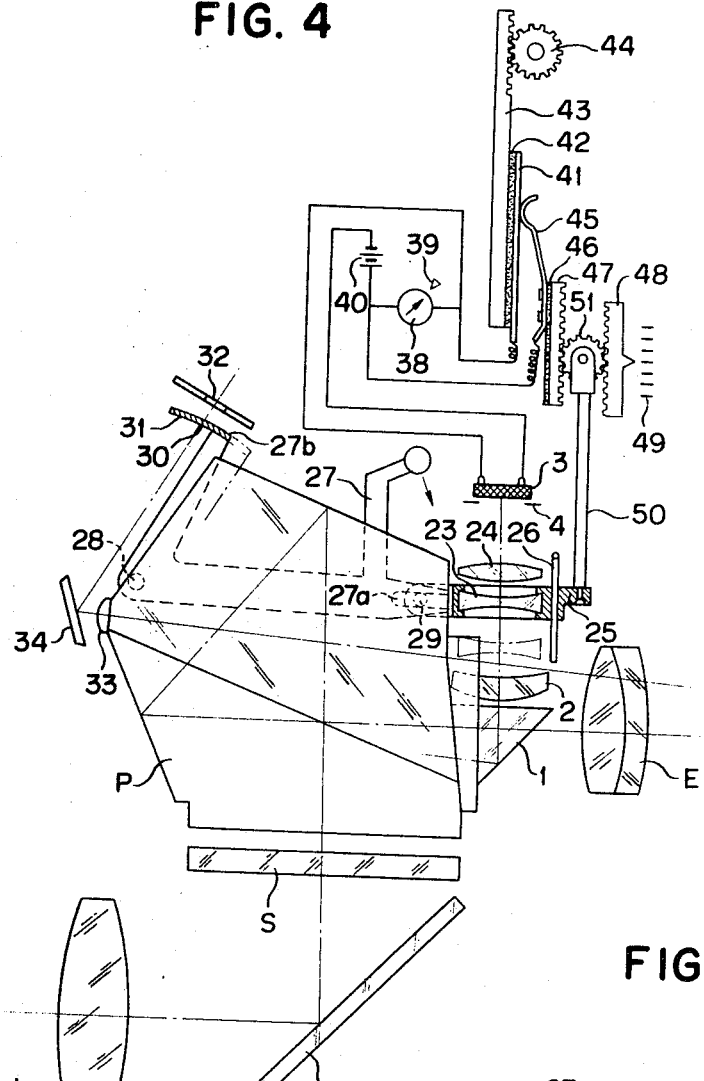
FIG. 4 shows a second embodiment of the invention where a zoom system is employed.

Now, referring to the first embodiment shown in FIGS. 1 through 3, L is a camera lens, M is a movable reflecting mirror, F is the image surface of film, S designates a focus plate corresponding to the image surface of said film, P designates a penta prism, and E is a finder eyepiece lens.

Elements 1, 1' are the light-receiving prisms cemented at a position outside of the finder light path on the eyepiece side of the penta prism, and 2, 2' are light receiving lenses. Elements 3, 3' are photoconductors such as CdS which constitute light receiving portion of the exposure meter, the light receiving surface thereof being almost on the same plane as the respective focal planes of the respective lenses 2, 2'. The respective light paths for the two lenses, as shown in FIG. 3 are angularly disposed with respect to the viewing axis. Elements 4, 4' are the field stops for determining the range of the image area to be measured, and are provided in front of the respective photoconductors 3, 3'. As is shown in FIG. 3, one of the field stops 4 has an opening conforming to the area of wide image surface $a$ on the surface of the focusing plate, and the other field stop 4' has an opening conforming to the range of small image surface $b$. Element 5 is a galvanometer which is connected in parallel with the photoconductors 3, 3', and 6 is an index for the pointer of the galvanometer; the index 6 being movable with respect to said galvanometer 5 for correcting the changed position of the standard indicated value of the galvanometer that is caused by the switching operation of the range of the image surface to be measured. Members 7 and 8 are the conventional exposure calculating mechanisms composed of the resistance element and wiper brush respectively which can be moved relatively and are interlocked with respect to stop value, shutter time and film sensitivity setting knobs (not shown). Member 9 is a direct current electric source, and 10 is a resistance for correction. The components 5 to 10 form a conventional exposure calculating circuit in cooperation with each other. Member 11 is a contact permitting measurement of the illumination of small image surface $b$, and 12 is a contact permitting measurement of the illumination of large image surface $a$. Member 13 is a switch which is normally against the contact 12 for measuring the illumination of large image surface $a$, and 14 is a switch button for operating the switch 13.

The device of this embodiment provides that when the switch 13 is in the position as is shown in FIG. 3, the usual exposure calculating circuit is connected to the photoconductor 3 to carry out the exposure measurement corresponding to the large image surface $a$. When the switch button 14 is pushed in the direction shown by the arrow in FIG. 3, the switch 13 engages the contact 11 to connect the exposure measurement circuit for the small image surface $b$ and the exposure measurement corresponding to the small image surface may be carried out.

Thus, when the exposure meter circuit is switched from wide area to the narrow area on the focusing glass or vice versa, and the pointer of the galvanometer 5 moves, the index 6 is shifted. Alternatively, the galvanometer itself is rotated by a predetermined amount to correct the exposure measurement. It becomes more convenient if this operation is carried out automatically in interlocking relation with the operation of switching the exposure circuits.

As mentioned above, both average and partial photometric measurement can be carried out freely by manual operation and furthermore as only one exposure meter circuit is required to change the acceptance angle, and as the light-receiving means is positioned at the rear of the penta prism, the space for the exposure meter is minimized, thus making the camera very compact.

Next, referring to the second embodiment shown in FIGS. 4 to 7, L designates a camera lens, M is the movable reflecting mirror, S is the focusing plate corresponding to the image surface of the film, P designates the penta prism, and E is the finder eyepiece lens. Element 1 is a light-receiving prism which is cemented outside of the finder light path on the end surface of the eyepiece side of said penta prism P, and 2, 23 and 24 are the respective lenses which compose a zoom optical system. The zoom optical system may be changed gradually or stage by stage or continuously, the image area to be measured on the surface of the focusing plate using the zooming effect by carrying out the operation of moving the center concave lens 23.

In other words, in case the concave lens 23 is at the position shown by the solid line in FIG. 4, the composite focal length of the zoom optical system composed of the lenses 2, 23 and 24 becomes large, and therefore as is shown in FIG. 7A the light rays from the small image area $b$ on the surface of the focusing plate fall on the photoconductor 3 which is described hereinafter, and the illumination within said area is measured. When the concave lens 23 is moved to the position as indicated by the dotted line in FIG. 4 the composite focal length of the zoom optical system becomes shorter, and the light rays from the wide image area $a$ fall on the photoconductor 3 as is shown in FIG. 7A. On the other hand, in case the amount of the light to be measured is not sufficient but only one light-receiving portion is provided, another light-receiving portion 1', 2', 23', 24' and 3' of the same efficiency can be provided as shown in FIG. 5.

In addition, the zoom optical system is so devised that the composite F number (brightness) of the optical system itself may not be changed even if the composite focal length should be changed by the zooming effect, and therefore even when the image area to be measured should be changed as mentioned above, the amount of the incident light rays on the light receiving surface becomes unchanged.

Element 25 is a frame for retaining the concave lens 23, and is arranged to move back and forth on the guide bar 26. The light receiving surface of photoconductor 3 is positioned conjugate with the surface of the focusing plate, a field stop 4 being provided in front of the photoconductor. A lever 27 which can be operated from outside of camera, is movably supported by a shaft 28 and a groove 27a which is formed on one end thereof. The lever 27 is fitted to a pin 29 on said retaining frame 25 to move said retaining frame 25. The reference characters 30, 31 which represent the image area to be respectively measured are formed as shown in FIG. 4 on the bent portion of 27b on the other end of the lever 27 so that the light rays bypass the lever structure. The bent portion 27b itself is made of transparent material, and the members 30, 31 can be made of nontransparent material. Element 32 is an indicator window provided at a fixed portion of a camera so that observation can be made from outside of the camera. Window 32 also works as a window for taking in light when observed from inside of the camera.

Element 33 is a convex lens cemented at a position so as to face the eyepiece lens E at the back of said penta prism P. The lens 33 is constructed so that it is possible to observe outside of the normal view frame of the finder by conventional means, by directing the image of said members 30 and 31 through the small mirror 34.

Member 38 is a galvanometer which is connected in parallel with said photoconductor 3, and 39 is an index for the pointer of said galvanometer. Member 40 is a direct current electric source, and 41 is a linear form of resistance element for carrying out the exposure calculation, and is adhered on the base plate 43 through insulating material 42. Member 44 is a gear for inserting the shutter time value and the film sensitivity value into the exposure meter circuit, the gear 44 meshes with a portion of the base plate 43. Member 45 is a brush which moves on linear form of the resistance element and is secured to the base plate 47 through the insulating material 46. Reference character 48 denotes a member for determining the objective stop value, the member being movably positioned relative to the objective stop scale 49 formed on a fixed portion of the camera. Member 48 is a rack that meshes with a differential gear 51 which is rotatably retained on the connecting rod 50 connected to said retaining frame 25. In addition, the rack 48 for determining the stop value, can be moved in accordance with a change in the stop valve on the side of a camera by conventional means.

In case the operation lever 27 is at the position as is shown in FIG. 4 only the light rays from the small image area $b$ on the surface of the focusing plate enter the photoconductor 3, and therefore when the main object to be photographed is placed within said area $b$, the proper exposure of the main object can be obtained without being affected by a background having high brightness, and the corresponding density level of the film can be obtained.

Next, when the operation lever 27 is pushed down in the direction as is shown by the arrow in FIG. 4, the concave lens 23 is moved downwardly by means of the groove 27a in the operation lever 27 and the pin 29 to widen the image area to be measured. At this time, the connecting rod 50 is also lowered simultaneously and the differential gear 51 drives the member 48 for setting the objective stop value. The relative position of the brush 45 and the resistance element 41 is changed by that much, and the sensitivity of the exposure meter is lowered. Even if the input i.e., amount of light incident on the photoconductor 3 should be increased more than the case of the measurement of the light intensity of a desired limited area of the image surface because of the distribution of the brightness within the range of the wide image area to be measured, it is possible to obtain almost the same composite value of stop value and shutter time or the like as in the case of the measurement of the illumination of small image area so that the density level of the film for the main object becomes almost equal.

If the image area to be measured is changed in a stepwise manner, it is preferable that the subject of the large area to be photographed should occupy the whole area of the finder field, while the subject of the small area to be photographed should occupy a small area around a split prism (not shown) but which is normally provided at the center of the focusing plate S. It is also desirable to provide a pattern or a division mark showing said areas, respectively, on the focusing plate S. Then, the pattern or mark can be observed the same as members 30 and 31 so that the photographer can easily identify through the finder eyepiece or from outside of the camera, the portion of the finder field under observation. In case the image area to be measured is continuously changed, it is preferable to make the indicator window 32 optically the same as the finder field and to provide, instead of the transparent indication members 30 and 31, a conventional movable mask, which is usually utilized for a camera finder. The mask is moved in accordance with the selection of the image area to be measured so as to match the area not masked to the selected image area to be measured.

Figure 8:
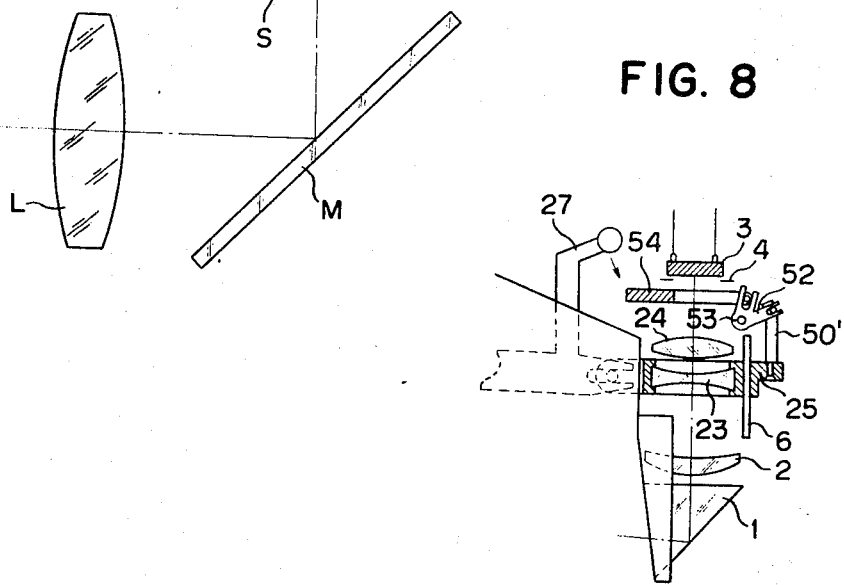
FIG. 8 shows a third embodiment of the invention.

In changing the sensitivity of the exposure meter, the operation can be carried out on the output side of the light-receiving portion by making use of the exposure calculating mechanism as is shown by the embodiment of FIG. 4. On the other hand as in the case of the embodiment of FIG. 8, in order to change the sensitivity of the exposure meter, the input side of the light-receiving portion can be controlled so as to change the amount of light coming into the light-receiving surface either by inserting a filter of appropriately selected density or a light-reducing member 54 in front of the light-receiving surface through a bellcrank 52 pivoted on a fixed shaft 53, one arm of the bellcrank being connected through a link 50' to the member 25, while the other arm is connected by a pin and slot connection to the filter member 54. Also, the second and third embodiments can be applied to the structure of an exposure meter wherein, when the image area to be measured is changed, the amount of the light rays coming into the light-receiving portion is changed.

The main object of the second embodiment is to correct the sensitivity of an exposure meter in accordance with the change of the image area to be measured. The structure provides for changing the light-receiving angle of the light-receiving optical system according to which the amount of incident light can be kept constant by means of the relative movement of the field stop and light amount stop. Where several light-receiving portions having different areas to be measured are provided in advance, the light-receiving portions are optionally selected. In case a zoom optical system is employed, as in the second embodiment shown in the drawing it is not necessary to employ an expensive zoom system, and therefore it is very advantageous in the manufacturing of the same.

FIGS. 9 and 10 show a fourth embodiment in which instead of the zoom optical system as in the second embodiment (FIG. 4), a light-receiving portion is provided where the amount of incident light rays is unchanged even when the angle of receiving light rays varies.

In FIG. 9, 55 is a bar for supporting a light-receiving lens 56, 57 is a stop provided behind the lens 56. Member 58 is a field stop provided in front of the photoconductor 59. Both stops 57 and 58 are operated by a common stop ring 60 through the respective cam grooves 60a and 60b to make the action similar to the zoom action in the second embodiment. In other words, when the aperture size of the field stop 58 is reduced to reduce the area on the focusing surface, the aperture size of the stop 57 is increased to permit relatively large light flux to be introduced. When the aperture size of the field stop 58 is increased to enlarge the area on the focusing glass, then the aperture size of the stop 57 is decreased to restrict the amount of the entrance light rays so that the amount of light rays impinging on the photoconductor 59 is made constant. A member 61 is an operating ring rotatable along with the stop ring 60 through the pin 62; the operating ring 61 corresponds to the lever 27 in the second embodiment. When, in the fourth embodiment shown in FIG. 9, it is not possible due to lack of space or mechanical restriction of the stop mechanism to maintain the amount of the incident light rays constant, some compensation must be made. FIG. 10 shows a mechanism for compensating this shortcoming which is similar to that shown in FIG. 4. In FIG. 10, the members which are the same as those disclosed in FIG. 4 are assigned the same reference numerals. A gear member 63 is also provided meshing with the operating ring 61 to transfer the movement of the latter to the movement of the differential gear 51 through the member 64, 65 and 50.

As has been described when the second, third or fourth embodiment is employed, there is an advantage that it is possible to obtain almost equal film density level for the main object to be photographed even when the object of the same composition is measured by means of either wide image area measurement or small image area measurement.

We claim:

1. A single-lens reflex camera having a built-in exposure meter comprising, in combination: a photographic objective; a view finder having a focusing glass on which the objective forms an image of the scene to be photographed; an eyepiece lens; a penta roof-edge prism arranged in the path of the light beam in front of the eyepiece lens; means for receiving the light from different areas of said focusing glass through the penta roof-edge prism, said light-receiving means including means responsive to the light from said focusing glass for providing an electric signal in accordance with the brightness thereof, and means for variably restricting the acceptance angle of said light-responsive means in order to receive, respectively, a light coming from the whole or partial area of the focusing glass, an exposure meter circuit connected to said light-responsive means, and manual means operable for controlling the variation of the acceptance angle from outside of the camera in conjunction with said light-receiving means.

2. A single-lens reflex camera according to claim 1, wherein said restricting means includes a variable focal-length lens system having a movable element moved by said manual means, whereby a variation of the focal length of the lens system in response to movement of said movable element causes difference of acceptance angle.

3. A single-lens reflex camera according to claim 1, wherein said restricting means includes image-forming means for projecting the image of said focusing glass toward said light-responsive means, a variable aperture stop for said image-forming means, and a variable field stop provided in front of said light-responsive means, both said stops cooperating with said manual means so that the aperture of one stop is enlarged while that of the other becomes smaller, whereby the variation of the aperture of said field stop causes the change of said acceptance angle.

4. A single-lens reflex camera according to claim 1, further comprising means for changing the predetermined basic sensitivity of the exposure meter, said sensitivity changing means interlocked to said manual means.

5. A single-lens reflex camera according to claim 4, wherein said restricting means includes a variable focal-length lens having a movable element moved by said manual means, whereby a variation of the focal length of the lens system in response to movement of said movable element causes a change of acceptance angle, and wherein said sensitivity changing means includes a variable resistor for varying the output of the exposure meter and the connecting means for operably connecting said resistor with said movable element.

6. A single-lens reflex camera according to claim 5, wherein said connecting means includes a differential mechanism for adjusting the exposure factor of the camera.

7. A single-lens reflex camera according to claim 4, wherein said restricting means includes a variable focal-length system having a movable element moved by said manual means, whereby a variation of the focal length of the lens system in response to movement of said movable element causes a change of acceptance angle and wherein said sensitivity changing means includes a filter provided in front of said light-responsive means for varying the input thereof and connecting means for operably connecting said filter with said movable element.

8. A single-lens reflex camera according to claim 4, wherein said restricting means includes image-forming means for projecting the image of said focusing glass toward said light-responsive means, a variable aperture stop for said image-forming means, both said stops cooperating with said manual means so that the aperture of one stop is enlarged while that of the other becomes smaller, whereby the variation of the aperture of said field stop causes the change of said acceptance angle, and wherein said sensitivity changing means includes a variable resistor for varying the output of the exposure meter and connecting means for operably connecting said resistor with at least said field stop.

9. A single-lens reflex camera according to claim 8, wherein said connecting means has a differential mechanism for adjusting the exposure factor of the camera.

10. A single-lens reflex camera according to claim 1, wherein said light-receiving means has a pair of image-forming means, stop means and light-responsive means, said image-forming means projecting the image of said focusing glass toward said light-responsive means, and said stop means having respectively a different aperture to cause a change of the acceptance angle, said light-responsive means being connected in parallel to said exposure meter circuit, there being further included a switch means operated by said manual means for selecting one of said light-responsive means.